US012410031B2

(12) United States Patent
Kobayashi et al.

(10) Patent No.: US 12,410,031 B2
(45) Date of Patent: Sep. 9, 2025

(54) PRINTING APPARATUS

(71) Applicant: BROTHER KOGYO KABUSHIKI KAISHA, Nagoya (JP)

(72) Inventors: Isao Kobayashi, Nagoya (JP); Takashi Suzuki, Toyota (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 191 days.

(21) Appl. No.: 18/192,040

(22) Filed: Mar. 29, 2023

(65) Prior Publication Data

US 2023/0234803 A1 Jul. 27, 2023

Related U.S. Application Data

(63) Continuation of application No. PCT/JP2021/034983, filed on Sep. 24, 2021.

(30) Foreign Application Priority Data

Sep. 30, 2020 (JP) ................................ 2020-164975

(51) Int. Cl.
*B65H 35/00* (2006.01)
*B41J 11/66* (2006.01)

(52) U.S. Cl.
CPC ....... *B65H 35/0093* (2013.01); *B65H 35/008* (2013.01); *B41J 11/663* (2013.01); (Continued)

(58) Field of Classification Search
CPC ... B65H 3/44; B65H 7/02; B65H 29/58; B41J 13/10; B41J 11/00; B41J 11/70; B41J 11/0095
See application file for complete search history.

(56) References Cited

U.S. PATENT DOCUMENTS 8,911,167 B2 * 12/2014 Kanazawa ............... B26D 5/18 400/621
9,586,417 B2 * 3/2017 Chida .................. B41J 11/0095
(Continued)

FOREIGN PATENT DOCUMENTS

JP H0338358 A 2/1991
JP H0471873 A 3/1992
(Continued)

OTHER PUBLICATIONS

International Search Report dated Nov. 9, 2021 issued in PCT/JP2021/034983.

(Continued)

*Primary Examiner* — Leslie A Nicholson, III
(74) *Attorney, Agent, or Firm* — Scully, Scott, Murphy & Presser, PC

(57) ABSTRACT

There is provided a printing apparatus including: a holder configured to accommodate a printing medium; a conveyor configured to convey the printing medium along a conveying direction; a printer; a cutter configured to cut the printing medium; a first detector configured to detect front and rear ends of the printing medium; and a controller. A distance in the conveying direction between the first detector and the cutter is shorter than a length of one of media generated by dividing the printing medium into n-pieces of media. The controller is configured to: calculate a length in the conveying direction of the printing medium by using a result of the detecting of the front and rear ends, and set a cutting position of the printing medium; and cause the cutter to cut the printing medium at the set cutting position.

13 Claims, 10 Drawing Sheets

(52) U.S. Cl.
CPC ........ *B41J 2203/01* (2020.08); *B65H 2511/11* (2013.01); *B65H 2801/03* (2013.01)

(56) References Cited

U.S. PATENT DOCUMENTS

| | | | | |
|---|---|---|---|---|
| 10,836,187 | B2 * | 11/2020 | Sato | B41J 15/048 |
| 11,214,081 | B2 * | 1/2022 | Miura | B41J 11/663 |
| 11,413,890 | B2 * | 8/2022 | Nozawa | B41J 11/663 |
| 11,485,152 | B2 * | 11/2022 | Takahashi | B41J 11/663 |
| 11,806,994 | B2 * | 11/2023 | Takahashi | B41J 11/663 |
| 11,838,463 | B2 * | 12/2023 | Nishikawa | G06K 15/403 |
| 2003/0033915 | A1 | 2/2003 | Glemser et al. | |
| 2015/0273888 | A1 | 10/2015 | Chida | |
| 2021/0178785 | A1 | 6/2021 | Miura | |

FOREIGN PATENT DOCUMENTS

| | | | |
|---|---|---|---|
| JP | H04320867 | A | 11/1992 |
| JP | H0717090 | A | 1/1995 |
| JP | H08179576 | A | 7/1996 |
| JP | 2004090400 | A | 3/2004 |
| JP | 2004130623 | A | 4/2004 |
| JP | 2005193547 | A | 7/2005 |
| JP | 2005262810 | A | 9/2005 |
| JP | 2005350215 | A | 12/2005 |
| JP | 2006062116 | A | 3/2006 |
| JP | 2006168878 | A | 6/2006 |
| JP | 2007125819 | A | 5/2007 |
| JP | 2010-179467 | A | 8/2010 |
| JP | 2011121777 | A | 6/2011 |
| JP | 2014-117828 | A | 6/2014 |
| JP | 2015141332 | A | 8/2015 |
| JP | 2015196319 | A | 11/2015 |
| JP | 2018186448 | A | 11/2018 |
| JP | 2020001358 | A | 1/2020 |
| JP | 2020112696 | A | 7/2020 |
| JP | 2021094784 | A | 6/2021 |

OTHER PUBLICATIONS

International Preliminary Report on Patentability and Written Opinion dated Mar. 28, 2023 from related in PCT/JP2021/034983 together with English translation.
Extended European Search Report dated Sep. 30, 2024 from related EP 21 87 5390.3.

* cited by examiner

PRINTING APPARATUS

REFERENCE TO RELATED APPLICATIONS

This application is a Continuation Application of International Application No. PCT/JP2021/034983 which was filed on Sep. 24, 2021 claiming the conventional priority of Japanese patent Application No. 2020-164975 filed on Sep. 30, 2020. The disclosures of Japanese patent Application No. 2020-164975 and International Application No. PCT/JP2021/034983 are incorporated herein by reference in their entirety.

BACKGROUND ART

Conventionally, there have been image forming apparatuses including a cutting unit that cuts a standard sized sheet being conveyed for printing. One of such image forming apparatus is configured to generate two A4-size sheets by cutting an A3-size sheet into two equal parts.

DESCRIPTION

Here, a size of each of the standard-sized sheets to be used for printing has slight size variations due to a dimensional tolerance and other factors. For example, an A4-size sheet has the dimensional tolerance of approximately ±2 mm in a length in a conveying direction. In addition, the position of the sheet in the conveying direction may deviate by approximately ±1 mm in a cue process in which the sheet is conveyed to the printing unit. Due to such variations, that is the variation in the sizes of the sheets and the variation caused in the cue process, there is the problem that a variation in the lengths, in the conveying direction, of the cut papers occurs.

The present disclosure was made to solve the problem described above, and an object of the present disclosure is to provide a printing apparatus capable of cutting a printing medium into a desired size such that the printing medium of desired size is available.

In order to solve the problem described above, a printing apparatus according to an aspect of the present disclosure includes: a holder configured to accommodate a printing medium; a conveyor configured to take the printing medium from the holder and configured to convey the printing medium along a conveying direction; a printer configured to perform printing on the printing medium conveyed by the conveyor; a cutter configured to cut the printing medium conveyed by the conveyor; a first detector which is provided upstream in the conveying direction of the cutter, and which is configured to detect a front end and a rear end of the printing medium conveyed by the conveyor; and a controller. A distance in the conveying direction between the first detector and the cutter is shorter than a length in the conveying direction of one of media generated by dividing the printing medium into n-pieces of media (n is an integer not smaller than 2).

The controller is configured to: calculate a length in the conveying direction of the printing medium by using a result of the detecting of the front end and the rear end of the printing medium by the first detector, and set a cutting position of the printing medium so that the printing medium is divided into the n-pieces of media in the conveying direction; and cause the cutter to cut the printing medium at the set cutting position.

According to the printing apparatus having the configuration described above, it is possible to calculating the length in the conveying direction of the printing medium, set the cutting position of the printing medium, and then cut the printing medium by the cutter at the set cutting position, by using the result of the detecting of the front end and the rear end of the printing medium by the first detector. By doing so, it is possible to cut the printing medium into a desired size such that the printing medium of desired size is available. Further, the distance in the conveying direction between the first detector and the cutter is shorter than the length in the conveying direction of one of media generated by dividing the printing medium into n-pieces of media. Thus, it is possible to make the printing apparatus smaller.

According to one aspect of the present disclosure, it is possible to realize a printing apparatus capable of cutting a printing medium into a desired size such that the printing medium of desired size is available.

FIRST EMBODIMENT

The printing apparatus 1 according to the first embodiment of the present disclosure will be described below with reference to FIG. 1 to FIG. 7.

[Configuration of the Printing Apparatus]

Figure 1:
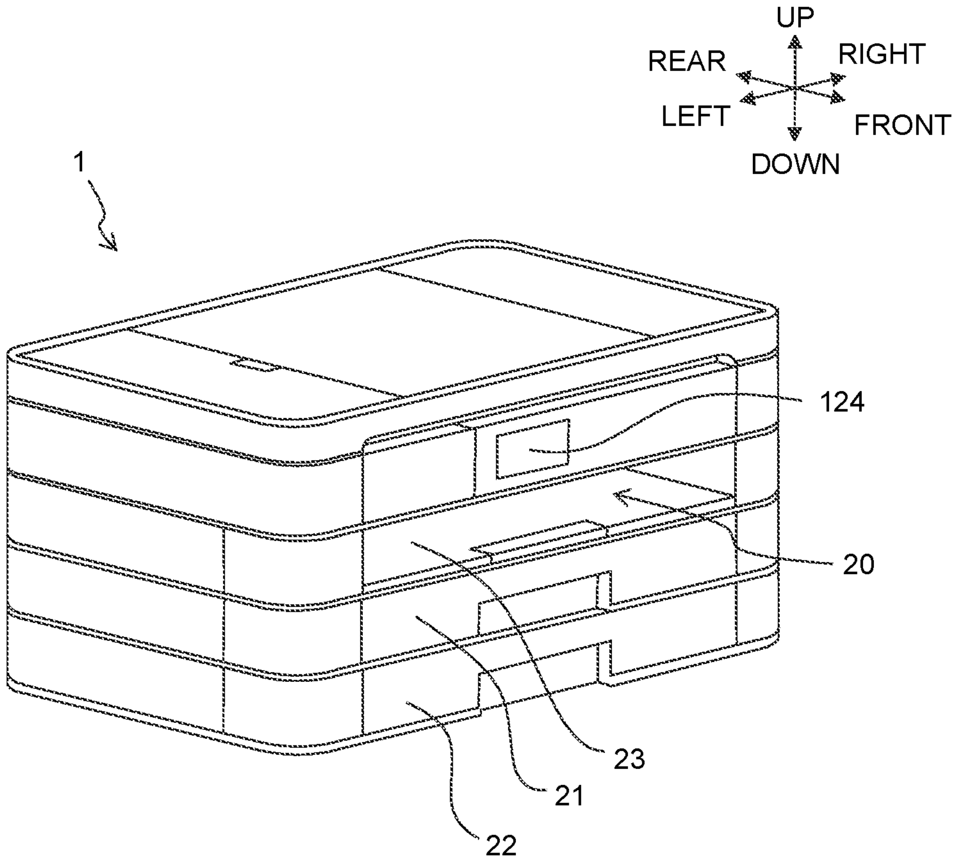
FIG. 1 depicts an external appearance of a printing apparatus.
Figure 2:
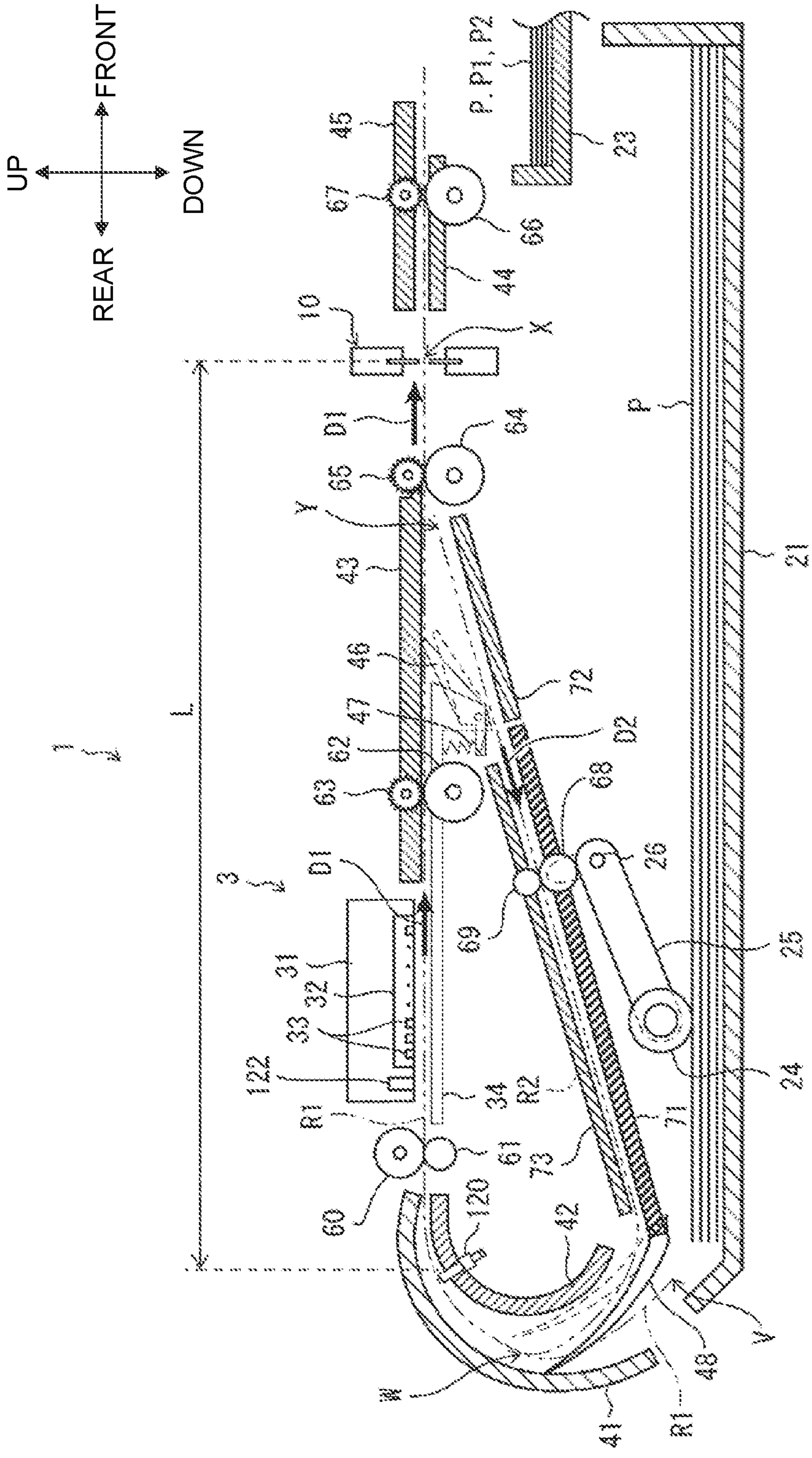
FIG. 2 is a cross-sectional view depicting an internal structure of the printing apparatus.

FIG. 1 depicts an external appearance of the printing apparatus 1 according the first embodiment. FIG. 2 is a cross-sectional view depicting an internal structure of the printing apparatus 1. The printing apparatus 1 depicted in FIG. 1 is an MFP (Multi-Function Peripheral) equipped with multiple functions such as printing, scanning, copying, and fax functions. For convenience of explanation, the up-down direction, the left-right direction, and the front-rear direction of the printing apparatus 1 are defined as indicated by the arrows in FIG. 1.

The printing apparatus 1 has a printing function of an inkjet system in which a print data indicated by a print job is printed onto a paper P (an example of a printing medium) by discharging, for example, ink. The image to be printed on paper P may be color printable image or an image dedicated to monochrome printing. The printing medium is not limited to paper medium, but may also be resin medium such as OHP sheets, for example.

As depicted in FIG. 1, an opening 20 is formed in a front surface of the printing apparatus 1. Feeding trays 21, 22, each of which is an example of a holder (an accommodating part), and a discharge tray 23 are detachably arranged in the opening 20. Each of the feeding trays 21, 22 is a tray for accommodating multiple sheets of the paper P and is open at the top. In the example depicted in FIG. 1, the two feeding trays 21, 22 are arranged in the up-down direction. The feeding tray 21 arranged upper side accommodates A4-size paper P which is an example of a first printing medium. On the other hand, the feeding tray 22 arranged lower side accommodates, a letter-size paper P which is an example of a second printing medium.

As also depicted in FIG. 2, the discharge tray 23 is arranged above the feeding tray 21. The discharge tray 23 is a tray for accommodating the paper P, the first paper P1, and the second paper P2 discharged by a conveying roller 66, and is open at the top. In the example depicted in FIG. 2, the drawing of the feeding tray 22 is omitted for convenience of explanation.

On the front surface of the printing apparatus 1, a setting unit 124 having a display screen is provided, as depicted in FIG. 1. The setting unit 124 is composed of a touch panel, for example, and is configured to allow a user to preform various settings related to printing by the printing apparatus 1 via the user's touch operation. The setting unit 124 accepts settings regarding the size of the paper P and whether the cutting process is to be executed or not. The information set by the setting unit 124 is output to a controller 100 (see FIG. 3).

As depicted in FIG. 2, the printing apparatus 1 includes a feeding roller 24, a first conveying route (path) R1, conveying rollers 60, 62, 64, 66, 68, a first flap 46, a second flap 48, a second conveying route R2, and a cutting unit (cutter) 10. Here, the feeding roller 24, and the conveying rollers 60, 62, 64, 66, 68 are an example of a conveying unit (conveyor). Note that the number of rollers provided in the first conveying route R1 and the second conveying route R2 can be changed as appropriate. For example, the conveying roller 66 may be omitted.

A feeding roller 24 is a roller for feeding the paper P accommodated in the feeding tray 21 or 22 to a conveying start position V of the first conveying route R1. The feeding roller 24 is rotatably supported by the front end of a feeding arm 25. The feeding arm 25 is rotatably supported on a shaft 26 supported by the frame of the printing apparatus 1. The feeding roller 24 rotates positively (that is, rotates in forward or normal direction) when a feeding motor 107 (see FIG. 3) is driven. As the feeding roller 24 rotates positively, the papers P accommodated in the feeding tray 21 is fed one by one to the conveying start position V of the first conveying route R1.

The first conveying route R1 is the route that extends upward from the rear end of the feeding tray 21, curves in the area defined by guiding members 41, 42, extends via the position at which the printing unit 3 is located, extends straightly in the area defined by guiding members 43, 44, 45, and reaches the discharge tray 23. The first conveying direction D1 is an example of a conveying direction.

A conveying roller 60 is arranged in the first conveying route R1 at a position upstream of the image recording unit 3 in the first conveying direction D1. A pinch roller 61 is arranged at a position opposing to the lower part of the conveying roller 60. The conveying roller 60 is driven by the conveying motor 108 depicted in FIG. 3. The pinch roller 61 rotates owing to the rotation of the conveying roller 60. When the conveying roller 60 and the pinch roller 61 rotate positively, the paper P is pinched between the conveying roller 60 and the pinch roller 61, and is conveyed to the printing unit 3.

The printing unit 3 is provided in the first conveying route R1 at a position between the conveying roller 60 and the conveying roller 62, and performs printing on the paper P. The printing unit 3 includes a carriage 31, a head 32, nozzles 33, and a platen 34. The head 32 is mounted on the carriage 31. A plurality of nozzles 33 are provided on the lower surface of the head 32. The head 32 is configured to discharge (eject) ink droplets from the nozzles 33. The platen 34 is a rectangular plate-shaped member on which the paper P is to be placed. In the process in which the carriage 31 is moved relative to the paper P supported by the platen 34, the nozzles 33 selectively discharge the ink droplets to the paper P so that the printing is performed on the paper P.

Figure 3:
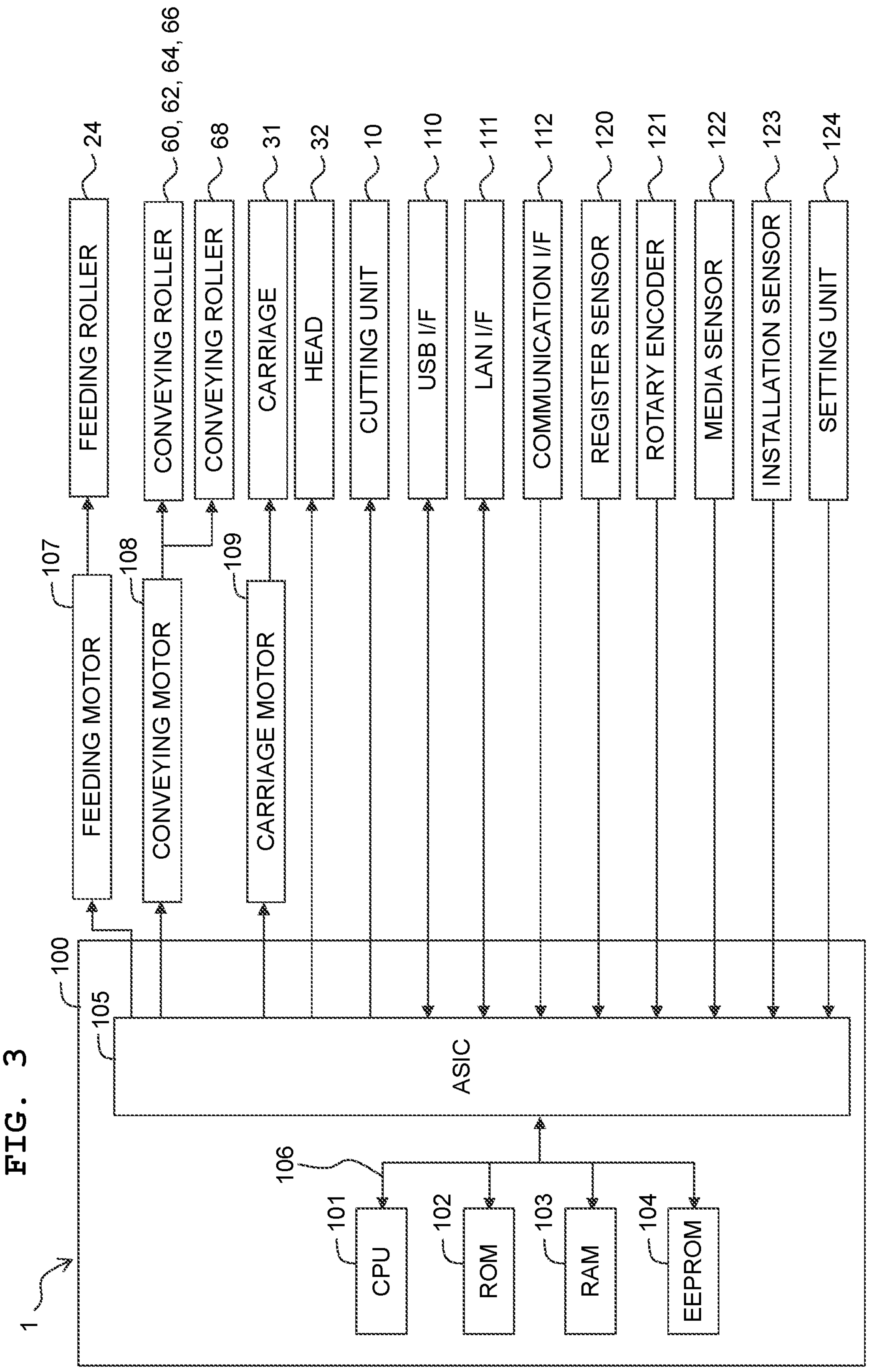
FIG. 3 is a block diagram depicting an electrical configuration of the printing apparatus.

A driving force of the carriage motor 109 depicted in FIG. 3 is transmitted to the carriage 31, and thus the carriage 31 moves back and forth in the direction orthogonal to the first conveying direction D1 (that is, the widthwise direction of the paper P). The controller 100 perform printing onto the paper P by repeatedly performing printing processes and line feed processes. In each of the printing process, a part of the image corresponding to one line is printed on the paper P by discharging the ink from the nozzles 33 while moving the carriage 31 in the widthwise direction of the paper P under a condition that the conveying of the paper P is stopped. In each of the line feed processes, the paper P is conveyed as much as a predetermined line feed amount by driving the conveying rollers 60, 62.

As depicted in FIG. 2, in the first conveying route R1, the conveying roller 62 is arranged at a position downstream of the printing unit 3 in the first conveying direction D1. A spur roller 63 is arranged at a position opposing to the upper part of the conveying roller 62. The conveying roller 62 is driven by the conveying motor 108 depicted in FIG. 3. The spur roller 63 rotates owing to the rotation of the conveying roller 62. When the conveying roller 62 and the spur roller 63 rotate positively, the paper P is pinched between the conveying roller 62 and the spur roller 63, and is conveyed downstream in the first conveying direction D1.

In addition, in the first conveying route R1, at a position downstream of the conveying roller 62 in the first conveying direction D1, a conveying roller 64 is arranged. A spur roller 65 is arranged at a position opposing to the upper part of the conveying roller 64. The conveying roller 64 is driven by the conveying motor 108. The spur roller 65 rotates owing to the rotation of the conveying roller 64. When the conveying roller 64 and the spur roller 65 rotate positively, the paper P is pinched between the conveying roller 64 and the spur roller 65, and is conveyed to the cutting unit 10 side. On the other hand, when the conveying roller 64 and the spur roller 65 rotate in reverse direction (that is, rotate inversely), the paper P is pinched between the conveying roller 64 and the spur roller 65 and is conveyed into the second conveying route R2 along the under surface of the first flap 46.

The first flap 46 is provided at a position, in the first conveying route R1, between the conveying roller 62 and the conveying roller 64. The first flap 46 is located near the branching position Y that is opposite to the guiding member 43. The first flap 46 is supported by the platen 34 so that the first flap 46 is swingable between a first state and a second state. In the first state depicted in solid line in FIG. 2, the first flap 46 is in contact with the guiding member 43 so as to close the first conveying route R1. On the other hand, in the second state depicted by the dotted line in FIG. 2, the first flap 46 is positioned lower than the position in the first state, and is separated from the guiding member 43 so that the paper P conveyed in the first conveying direction D1 is allowed to pass through the space between the first flap 46 and the guiding member 43.

The first flap 46 is biased upwardly by a coil spring 47. The one end of the coil spring 47 is connected to the first flap 46 and the other end of the coil spring 47 is connected to the platen 34. The first flap 46 turns into the first state by being biased by the coil spring 47, and the front end of the first flap 46 abuts on the guiding member 43.

The cutting unit 10 is arranged in the first conveying route R1, at a position between the conveying roller 64 and the conveying roller 66. The cutting unit 10 is a well-known cutter mechanism. The cutting unit 10 is configured to divide the paper P into n pieces of equal parts (n is an integer not less than two) by cutting the paper P.

Figure 4:
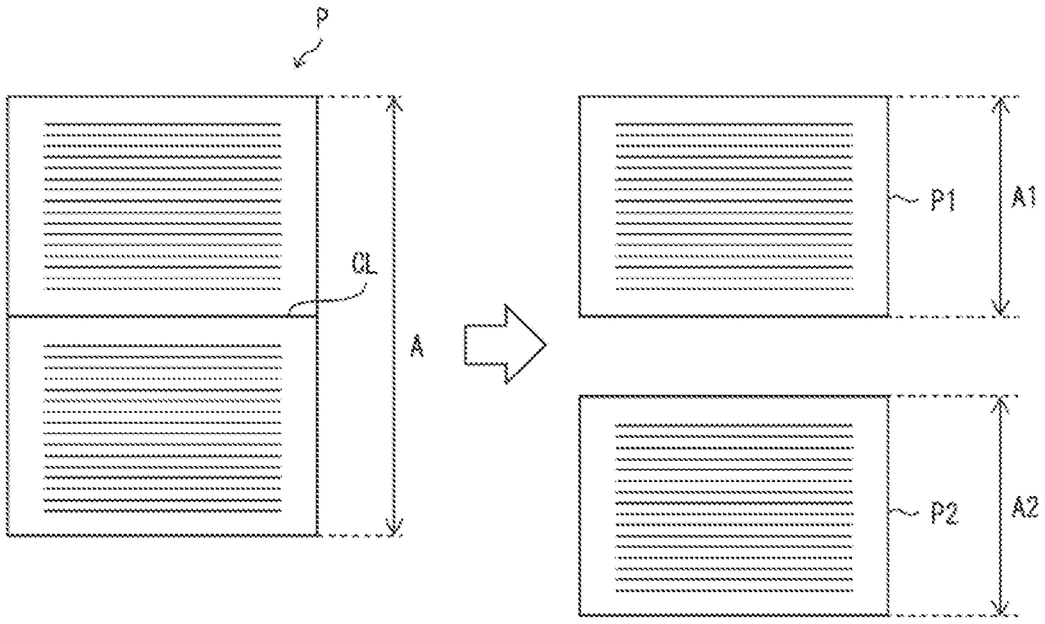
FIG. 4 depicts a paper before cutting and a first paper and a second paper after cutting.

FIG. 4 depicts the paper P before cutting, and a first paper P1 and a second paper P2 generated by cutting. In an example depicted in FIG. 4, the paper P is divided into two equal parts, that is the first paper P1 and the second paper P2, by being cut with the cutting unit 10. For example, in a case that the paper P has the A4 size, the first paper P1 and the second paper P2 each having the A5 size are generated. Note that in the first conveying route R1, the first paper P1 is conveyed ahead of the second paper P2.

A conveying roller 66 is arranged, in the first conveying route R1, at a position downstream in the first conveying direction D1 of the cutting unit 10. A spur roller 67 is arranged at a position opposing to the upper part of the conveying roller 66. The conveying roller 66 is driven by the conveying motor 108 depicted in FIG. 3. The spur roller 67 rotates owing to the rotation of the conveying roller 66. As the conveying roller 66 and the spur roller 67 rotate positively, the paper P, the first paper P1 and the second paper P2 are conveyed by the conveying roller 66 and are discharged to the discharge tray 23.

As depicted in FIG. 2, a second flap 48 is arranged in a swingable manner at a merging position W where the first conveying route R1 and the second conveying route R2 merges with each other. Specifically, the second flap 48 is capable of swinging between a first state depicted by the solid line in FIG. 2 and a second state depicted by the dotted line in FIG. 2. When the second flap 48 is in the first state, the second flap 48 and the guiding member 42 constitute a part of the second conveying route R2. When the second flap 48 is in the second state, the second flap 48 and the guiding member 41 constitute a part of the first conveying route R1.

A register sensor 120, which is an example of a first detector, is provided, in the first conveying route R1, at a position upstream of the conveying roller 60. The register sensor 120 is a sensor that detects passing of the front or rear end of the paper P through a position at which the paper P contacts with the conveying roller 60. As the register sensor 120, it is possible to use a sensor having an actuator that oscillates (fluctuates) when the paper P comes into contact with the actuator, an optical sensor, and the like.

The distance L in the first conveyance direction D1 between the register sensor 120 depicted in FIG. 2 and a position X where the cutting unit 10 is arranged is shorter than a length A1 in the conveying direction of the first paper P1 and the length A2 in the conveying direction of the second paper P2, the first and second papers P1, P2 being generated by cutting the paper P having the A4 size into two equal parts. In addition, the distance L in the first conveying direction D1 between the register sensor 120 and the position X where the cutting unit 10 is arranged is longer than a length A1 in the conveying direction of the first paper P1 and the length A2 in the conveying direction of the second paper P2, the first and second papers P1, P2 being generated by cutting the paper P having the letter size into two equal parts.

The conveying roller 60 is provided with a rotary encoder 121 that detects the rotation of the conveying roller 60. The rotary encoder 121 outputs a pulse signal to the controller 100 depending on the rotation of the conveying roller 60 (see, FIG. 3). The rotary encoder 121 includes an encoder disk and an optical sensor. The encoder disk rotates owing to the rotation of the conveying roller 60. The optical sensor reads the encoder disk being rotated, generates pulse signals, and outputs the generated pulse signals to the controller 100.

The printing unit 3 is equipped with a media sensor 122. The media sensor 122 is a sensor for detecting whether the paper P exists on the platen 34 or not. The media sensor 122 is used to detect that the front end of the paper P being conveyed in the first conveying route R1 arrives at the printing unit 3.

The second conveying route R2 is a route defined by guiding members 71, 72, 73, a conveying roller 68, and a pinch roller 69, etc. The second conveying route R2 branches off from the branching position Y upstream from the conveying roller 64 in the first conveying route R1. The second conveying route R2 is connected to the merging position W positioned in the first conveying route R1 at a position upstream of the printing unit 3 in the first conveying direction D1. This enables printing to be performed on both sides of the paper P by the printing unit 3.

[Electrical Configuration of the Printing Apparatus]

FIG. 3 is a block diagram depicting the electrical configuration of the printing apparatus 1 of the first embodiment. As depicted in FIG. 3, in addition to the above-described parts, the printing apparatus 1 includes a feeding motor 107, the conveying motor 108, a carriage motor 109, a USB interface (I/F) 110, a LAN interface (I/F) 111, and a communication interface (I/F) 112.

The controller 100 includes a CPU (Central Processing Unit) 101, a ROM (Read Only Memory) 102, a RAM (Random Access Memory) 103, an EEPROM 104 (registered trademark) which is an example of a memory, and an ASIC 105, which are connected by an internal bus 106. The ROM 102 contains program(s) that is used by the CPU 101 to control various operations, etc. The RAM 103 is used as a memory area that temporarily stores data, signal, and the like used when the CPU 101 executes the program(s) described above, or a work area for data processing when the CPU 101 executes the program(s) described above. The EEPROM 104 stores, for example, standardized lengths related to a plurality types of paper P. The controller 100 controls the feeding motor 107, the conveying motor 108, the carriage motor 109, the head 32, and the cutting unit 10, etc., based on the control program read from the ROM 102.

The ASIC 105 is connected with the feeding motor 107, the conveying motor 108, the carriage motor 109, the head 32, the cutting unit 10, the USB interface (I/F) 110, the LAN interface (I/F) 111, the communication interface (I/F) 112, the register sensor 120, the rotary encoder 121, the media sensor 122, an installation sensor 123 (an example of a second detector), and the setting unit 124. The ASIC 105 supplies driving current to the feeding motor 107, the conveying motor 108, and the carriage motor 109. The controller 100 controls the rotation of the feeding motor 107, the conveying motor 108, and the carriage motor 109 by, for example, a PWM (Pulse Width Modulation) control.

The controller 100 applies a driving voltage to vibration elements of the head 32 to discharge ink droplets from the nozzles 33. In addition, the ASIC 105 is connected to the register sensor 120, the rotary encoder 121, the media sensor 122, and the installation sensor 123. Then, the controller 100 detects the state of the printing apparatus 1 based on the signals output from the register sensor 120, the rotary encoder 121, the media sensor 122, and the installation sensor 123.

The register sensor 120 outputs an ON signal in a state that the paper P is passing (moving) through the position where the register sensor 120 is disposed and outputs an OFF signal in a state that the paper P does not pass (move) through the position where the register sensor 120 is disposed. That is, from the timing when the front end of paper P reaches the position of the register sensor 120 until the timing when the rear end of paper P passes the position of the register sensor 120, the register sensor 120 outputs the ON signal, and in a period other than described above, the resister sensor 120 outputs the OFF signal. The detection signal of the register sensor 120 is output to the controller 100.

The controller 100 calculates the length A in the first conveying direction D1 of the paper P based on a conveying amount of the paper P detected, by the rotary encoder 121, in a period from a timing when the register sensor 120 detects the front end of the paper P until a timing when the register sensor 120 detects the rear end of the paper P.

In a case that a conveying speed of the paper P is predetermined, the controller 100 may calculate the conveying amount of the paper P based on the time from the timing when the register sensor 120 detects the front end of the paper P until the timing when the register sensor 120 detects the rear end of the paper P, and the conveying speed of the paper P. The conveying amount of the paper P may be estimated by using the media sensor 122, as the first detector, instead of the register sensor 120. The register sensor 120 and the media sensor 122 may be used in combination or in parallel.

The installation sensor 123 is provided in each of the feeding trays 21, 22. Each of the installation sensors 123 is configured to detect whether the feeding tray 21 or 22 is installed in (attached to) the printing apparatus 1. Each of the installation sensor 123 outputs ON signal to the controller 100 in a state that corresponding feeding tray 21 or 22 is installed in the printing apparatus 100, and outputs OFF signal to the controller 100 in a state that the corresponding feeding tray 21 or 22 is not installed in the printing apparatus 1.

The USB interface (I/F) 110 is connected with a USB memory, a USB cable, etc. A PC is connected to the LAN interface 111 via a LAN cable. The controller 100 receives a print job via the USB interface 110 or the LAN interface 111, and then the controller 100 prints a printing data indicated by the print job onto the paper P by controlling each part of the printing apparatus 1.

[Flow of Control by the Controller]

Figure 5:
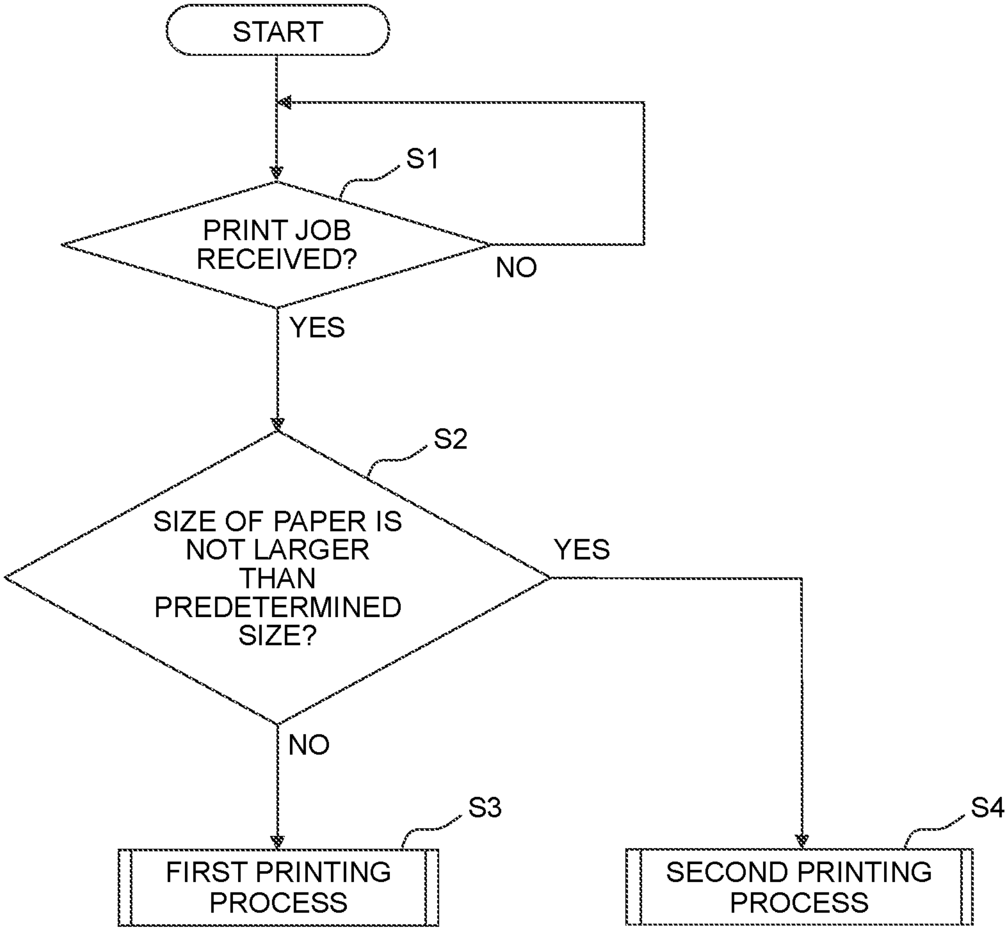
FIG. 5 is a flowchart depicting a flow of control by a controller of the printing apparatus.
Figure 6:
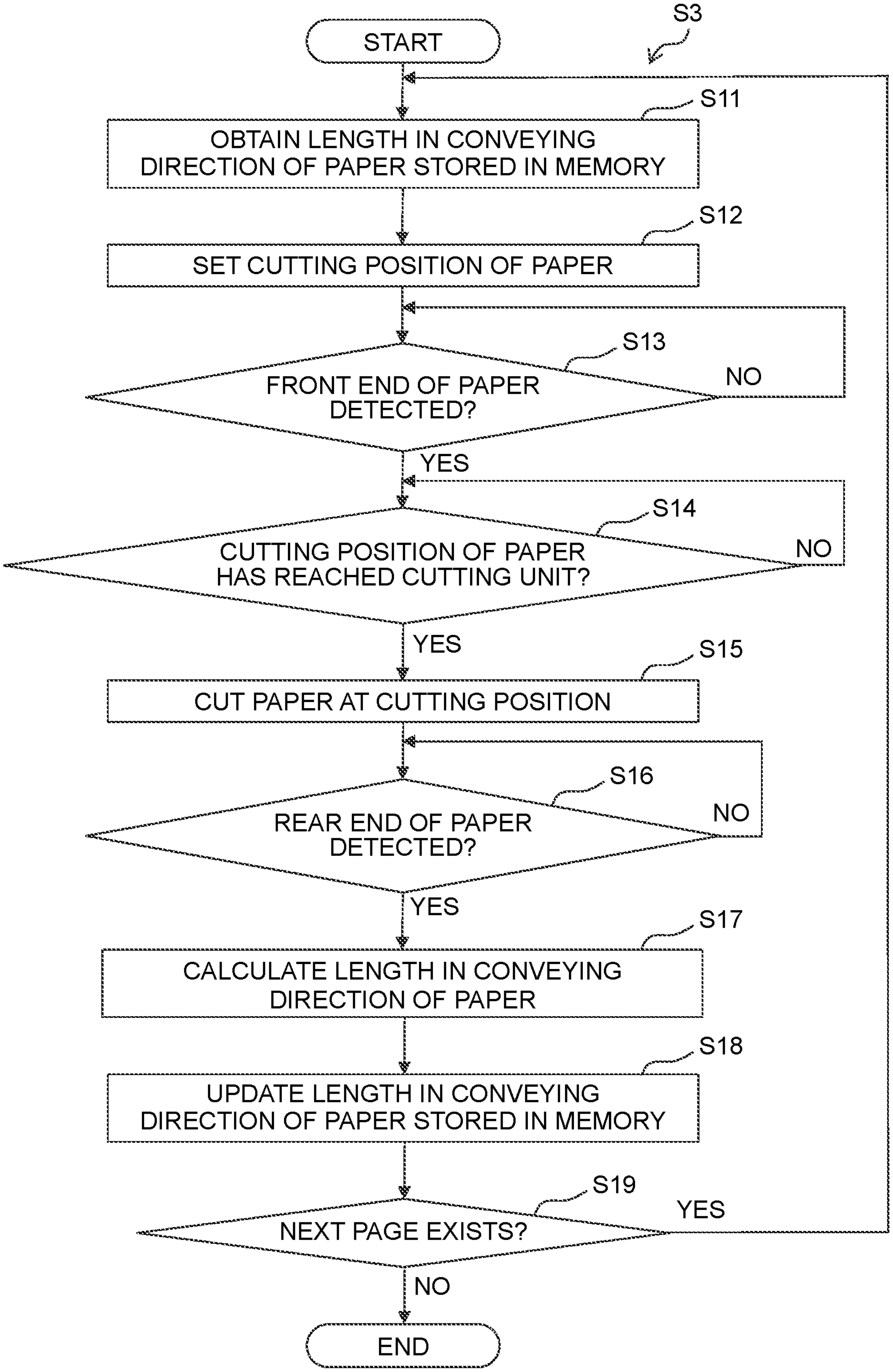
FIG. 6 is a flowchart depicting a flow of the first printing process of FIG. 5.
Figure 7:
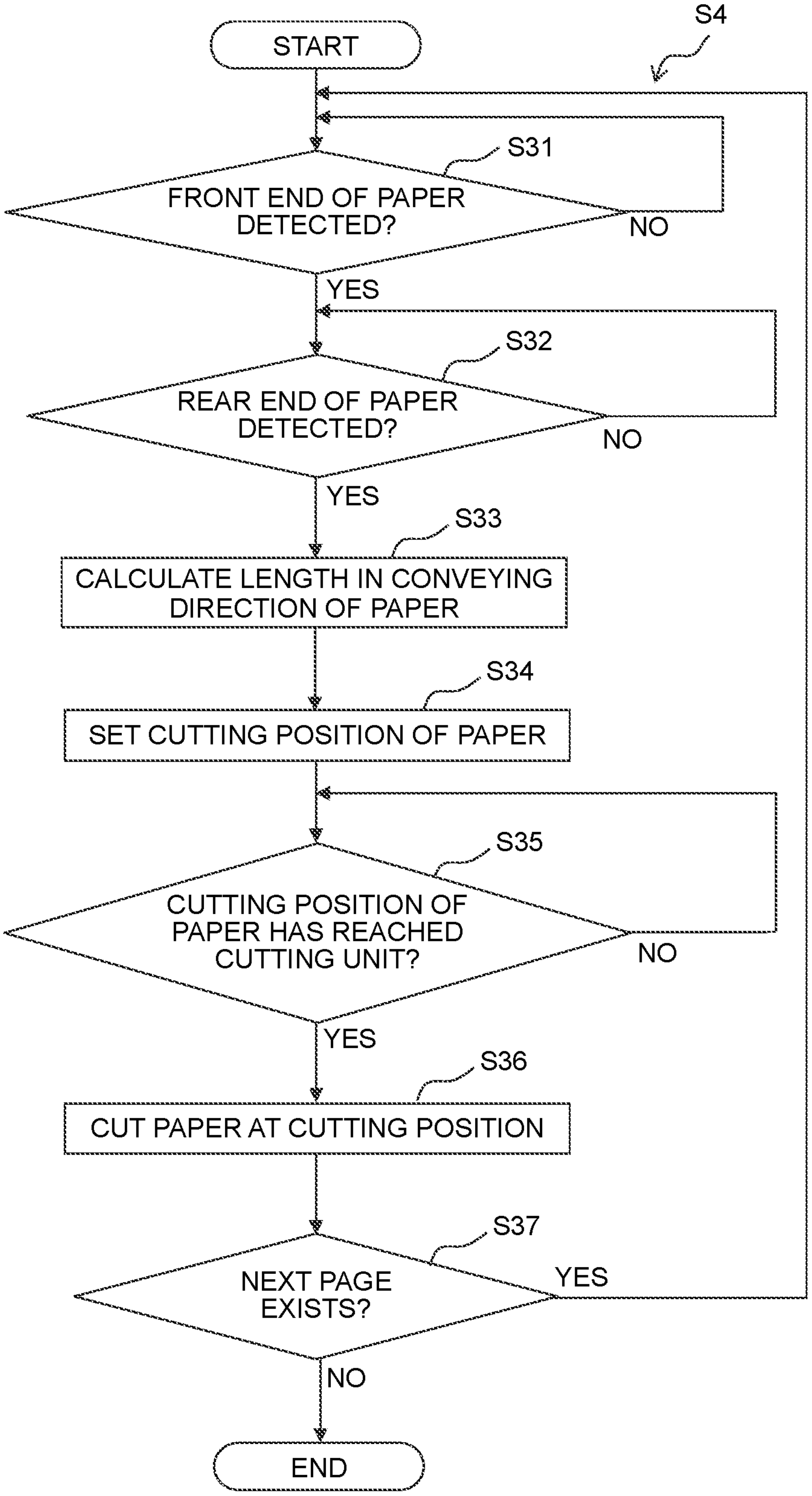
FIG. 7 is a flowchart depicting a flow of control of the second printing process of FIG. 5.

Next, the flow of control by the controller 100 of the printing apparatus 1 according to the first embodiment is described with reference to the flowcharts in FIG. 5 to FIG. 7. FIG. 5 is a flowchart depicting the flow of the control by the controller 100 of the printing apparatus 1 according to the first embodiment. FIG. 6 is a flowchart depicting the flow of the control of the first printing process S3 in FIG. 5. FIG. 7 is a flowchart depicting the flow of the control of the second printing process S4 in FIG. 5. Note that the flowcharts depicted in each of FIG. 5 to FIG. 7 is an example, and thus the processes are not limited to those depicted in FIG. 5 to FIG. 7.

In the flowchart depicted in FIG. 5, in a case that the printing apparatus 1 is turned on, the controller 100 first determines whether or not the print job has been received via the USB interface 110 or LAN interface 111, etc. (step S1). If the print job has not been received (S1: NO), the control unit 100 returns the process to the step S1, and if the print job has been received (S1: YES), the controller proceeds the process to the step S2. Note that, it is assumed that the user makes a setting regarding whether or not dividing the paper P into n pieces of equal parts (n is an integer not smaller than 2) in advance, by operating the setting unit 124. In the following, the case where the setting to divide paper P into two equal parts has been made will be described.

Next, the control unit 100 determines whether or not the size of the paper P indicated by the print job is not larger than the predetermined size (step S2). The predetermined size is, for example, a letter size. If the size of the paper P is larger than the predetermined size (step S2: NO), that is, if the size of the paper P is the A4 size or larger, the controller 100 performs the first printing process (step S3) depicted in FIG. 6. On the other hand, if the size of the paper P is not larger than the predetermined size (step S2: YES), that is, if the size of the paper P is the letter size or smaller, the controller 100 performs the second printing process (step S4).

In the first printing process S3 depicted in FIG. 6, the controller 100 obtains a length A in the conveying direction of the paper P stored in the EEPROM 104 (step S11). For example, if the size of the paper P is the A4 size, the controller 100 obtains the length of 297 mm (that is, the standardized length of the A4 size) from the EEPROM 104.

The controller 100 then sets the cutting position CL of the paper P (step S12). For example, in a case that the paper P is divided into two equal parts as depicted in FIG. 4, the position at which A1=A2=148.5 mm stands (that is, the position at which A=297 mm is divided into two equal parts) will be the cutting position CL of the paper P.

Next, the controller 100 takes the paper P from the feeding tray 21 and conveys the paper P in the first conveying route R1 along the first conveying direction D1, by driving the conveying motor 107 to rotate the conveying roller 24 positively. Then the controller 100 determines whether the front end of the paper P is detected or not by using a detection result of the register sensor 120 (step S13). In a case that the front end of the paper P is not detected (step S13:NO), the controller 100 returns the process to the step S13. In a case that the front end of the paper P is detected (step S13: YES), the controller 100 advances the process to the step S14.

Here, if the front end of the paper P reaches the conveying roller 60, the controller 100 conveys the front end side of the paper P to the printing unit 3 by driving the conveying motor 108 to rotate the conveying rollers 60, 62, 64, 66. Then, the controller 100 starts the printing by the printing unit 3 to the paper P conveyed to the printing unit 3.

Next, the controller 100 determines whether the cutting position CL of the paper P has reached the position X where the cutting part 10 is arranged (step S14). Specifically, the controller 100 determines that the cutting position CL of the paper P has reached the position X when the conveying amount of the paper P, detected by the rotary encoder 121, after the detection of the front end of the paper P by the register sensor 120 reaches the length L+A1, that is the sum of the length from the front end of the paper P to the cutting position CL (that is, the length A1 of the first paper P1 in the conveying direction) and the distance L in the first conveying direction D1 between the register sensor 120 and the position X at which the cutting unit 10 is arranged. The controller 100 returns the process to the step S14, in a case that the cutting position CL of the paper P has not reached the position X at which the cutting part 10 is arranged (step S14: NO). The controller 100 advances the process to the step S15 in a case that the cutting position CL of the paper P has reached the position X at which the cutting unit 10 is arranged.

In the step S15, the controller 100 cuts the paper P at the cutting position CL set in the step S12, by controlling the cutting unit 10. By doing so, the paper P is divided into the first paper P1 and the second paper P2 being two equal parts, as depicted in FIG. 4. Here, the printing by the printing unit 3 to the first paper P1 has been ended before the paper P is divided into the first paper P1 and the second paper P2 being two equal parts.

Next, the controller 100 determines whether the register sensor 120 has detected the rear end of the paper P or not (step S16). In a case that the register sensor 120 has not detected the rear end of the paper P (step S16: NO), the controller 100 returns the process to the step S16. In a case that the register sensor 120 has detected the rear end of the paper P (step S16: YES), the controller 100 advances the process to the step S17.

In the step S17, the controller 100 calculates the length A in the first conveying direction D1 of the paper P. Specifically, the controller 100 calculates the length A in the first conveying direction D1 of the paper P based on the conveying amount of the paper P detected by the rotary encoder 121 in a period from a timing when the register sensor 120 detects the front end of the paper P until a timing when the register sensor 120 detects the rear end of the paper P.

After the step S17, the controller 100 updates the length A in the first conveying direction D1 of the paper P stored in the EEPROM 104 being the memory to the length A in the first conveying direction D1 of the paper P calculated in the step S17 (step S18). For example, in a case that the length A in the first conveying direction D1 of the paper P calculated in the step S17 is 299 mm, 299 mm is stored in the EEPROM 104 as the length Ain the first conveying direction D1 of the paper P.

Here, the controller 100 calculates the length A in the conveying direction of the paper P for each of the plurality of feeding trays 21 in a case that the feeding tray 21 is provided as a plurality of feeding trays. Then the controller 100 stores, in the EEPROM 104, the length A in the conveying direction corresponding to the paper P stored in the feeding tray 21, for each of the plurality of feeding trays 21.

Next, the controller 100 determines whether the print job includes the next page or not (step S19). In a case that the print job does not have the next page (step S19: NO), the controller 100 ends the printing by the printing unit 3 to the second paper P2, and discharges the first paper P1 and the second paper P2 to the discharge tray 23. On the other hand, in a case that the print job includes the next page (S19: YES), the controller 100 ends the printing by the printing unit 3 to the second paper P2 and discharge the first paper P1 and the second paper P2 to the discharge tray 23, and then returns the process to the step S11.

Then, in the step S11, the controller 100 obtains the length A in the first conveying direction D1 of the paper P updated in the step S18 from the EEPROM 104. In this case, the controller 100 obtains 299 mm as the length Ain the first conveying direction D1 of the paper P1, and sets the cutting position CL of the paper P to be a position at which A1=A2=149.5 mm stands (step S12). After that, the controller 100 performs the processes similar to those in the steps S13 to S19 described above.

That is, the controller 100 calculates the length A in the conveying direction of each of the papers P whenever each of the papers P is taken from the feeding tray 21 or 22, and then the controller 100 sets the cutting position CL of the next paper P taken from the feeding tray 21 or 22 next to the each of the papers P by using the calculated length A in the conveying direction of each of the papers P so that the next paper P will be divided into two equal parts in the conveying direction.

Next, the second printing process S4 will be explained with reference to FIG. 7. In the second printing processing S4 depicted in FIG. 7, the controller 100 takes the paper P from the feeding tray 22 and conveys the paper P along the first conveying direction D1 in the first conveying route R1 by driving the conveying motor 107 to rotate the feeding roller 24 positively. In this case, the paper P has the letter size.

Then, the controller 100 determines whether the front end of the paper P is detected or not by using the detection result of the register sensor 120 (step S31). In a case that the front end of the paper P is not detected (step S31:NO), the controller 100 returns the process to the step S31. In a case that the front end of the paper P is detected (step S31: YES), the controller advances the process to the step S32.

Here, if the front end of the paper P reaches the conveying roller 60, the controller 100 conveys the front end side of the paper P to the printing unit 3 by driving the conveying motor 108 to rotate the conveying rollers 60, 62, 64, 66. Then, the controller 100 starts the printing by the printing unit 3 to the paper P conveyed to the printing unit 3.

Next, the controller 100 determines whether the register sensor 120 has detected the rear end of the paper P or not (step S32). In a case that the register sensor 120 has not detected the rear end of the paper P (step S32: NO), the controller 100 returns the process to the step S32. In a case that the register sensor 120 has detected the rear end of the paper P (step S32: YES), the controller 100 calculates the length A in the first conveying direction D1 of the paper P (step S33) like the step S17.

Then, the controller 100 sets the cutting position CL of the paper P based on the length A in the first conveying direction D1 of the paper P calculated in the step S33 (step S34). After the step S34, the controller 100 determines whether the cutting position CL of the paper P has reached the position X at which the cutting unit 10 is arranged or not (step S35). Specifically, the controller 100 determines that the cutting position CL of the paper P has reached the position X in a case that the conveying amount of the paper P detected by the rotary encoder 121, after the detection of the rear end of the paper P by the register sensor 120, reaches the length L−A2 being the length obtained by subtracting the length A2 in the conveying direction D1 of the second paper P2 from the distance L described above, the second paper P2 being obtained by dividing the paper P into two equal parts.

In a case that the paper P has not reached the position X where the cutting unit 10 is arranged (step S35:NO), the controller 100 returns the process to the step S35. In a case that the paper P has reached the position X where the cutting unit 10 is arranged (step S35: YES), the controller 100 cuts the paper P at the cutting position CL (step S36). Here, in a case that the paper P having the letter size is to be cut, the length A1 in the first conveying direction D1 of the first paper P1, the length A2 in the first conveying direction D1 of the second paper P2, and the distance L fulfill the relationship of $A1=A2<L$. Thus, it is possible to calculating the length in the conveying direction of the paper P being cutting objective in the step S33, set the cutting position CL of the paper P in the step S34 by using the calculation result of the paper P itself, and cut the paper P at the cutting position CL in the step S36.

After the step S36, the controller 100 determines whether the print job includes the next page or not (step S37). In a case that the print job does not have the next page (step S37: NO). the controller ends the printing by the printing unit 3 to the second paper P2, and discharges the first paper P1 and the second paper P2 to the discharge tray 23. On the other hand, in a case that the print job includes the next page (step S37: YES), the controller 100 ends the printing by the printing unit 3 to the second paper P2 and discharges the first paper P1 and the second paper P2 to the discharge tray 23; and then the controller 100 returns the process to the step S31 and after that performs the processes same as or similar to those of the step S32 to the step S37 described above.

In the printing apparatus of the first embodiment described above, the length A in the first conveying direction D1 of the paper P can be calculated and the cutting position CL of the paper P can be set, by using the detection result of the register sensor 120 regarding the front end and the rear end of the paper P, and then it is possible to cut the paper P at the set cutting position CL by the cutting unit 10. Therefore, it is possible to cut the paper P into a desired size such that the paper P having the desired size is available.

The distance L in the first conveying direction D1 between the register sensor 120 and the cutting unit 10 is shorter than the lengths A1, A2 in the first conveying direction D1 of the paper P1, P2 (the length of the single sheet generated by dividing the paper P into two equal parts). Thus, it is possible to make the size of the printing apparatus 1 smaller.

In a case that the printing for the first sheet of the papers P (that is, the first sheet among the sheets to which the printing will be performed) is performed, the controller 100 sets the cutting position CL of the paper P by using the standardized length stored in the EEPROM 104, without conveying the paper P in the second conveying route R2 in the second conveying direction D2. By doing so, it is possible to cut the first sheet of the papers P swiftly.

The controller 100 calculates the length A in the conveying direction D1 of each of the papers P whenever each of the papers P is taken from the feeding tray 21 or 22, and then the controller 100 sets the cutting position CL of the next paper P taken from the feeding tray 21 or 22 next to each of the papers P of which the length A in the first conveying direction D1 is calculated, by using the calculated length A in the conveying direction D1 of each of the papers P. By resetting the cutting position CL of each of the papers P using the calculating result of the paper P conveyed right before in such a manner, it is possible to reduce degradation of cutting accuracy.

In a case that the plurality of feeding trays 21 is provided in the printing apparatus, the cutting position CL of the paper P corresponding to each of the feeding trays 21 is set by using the calculating result of the length A in the conveying direction of the paper P corresponding to each of the feeding trays 21. Thus, each of the paper P can be cut into a desired size depending on a type of the paper P accommodated in each of the plurality of feeding trays 21.

In a case that the paper P has the letter size (step S2: YES), the cutting position CL of each of the papers P is set by calculating the length A in the conveying direction of each of the plurality of papers P taken from the feeding tray 22, in the second printing process S4 depicted in FIG. 7. By doing so, it is possible to cut the plurality of papers P having the letter size accurately at a desired cutting position CL.

Note that, in the first printing process S3 of the first embodiment described above, the step S17 and the step S18 may be omitted in the printing for the second and the following sheets. That is, the standardized length stored in the EEPROM 104 beforehand may be used in the printing for the first sheet, and the calculated length A in the conveying direction of the first sheet of the papers P may be used continuously in the printing of the second and the following sheets. In such a case, the second and following sheets of the papers P can be cut swiftly because it is not necessary to calculate the length A in the conveying direction of each of the papers P.

SECOND EMBODIMENT

A flow of control performed by the controller 100 of the printing apparatus 1 according to the second embodiment of the present disclosure will be described with reference to FIG. 8. Note that for the convenience of the explanation, members having functions same as those of the members explained in the first embodiment described above will be indicated by referential numerals same as those of the members explained in the first embodiment, and explanation for such members will not be repeated.

[Control Operation of the Controller]

Figure 8:
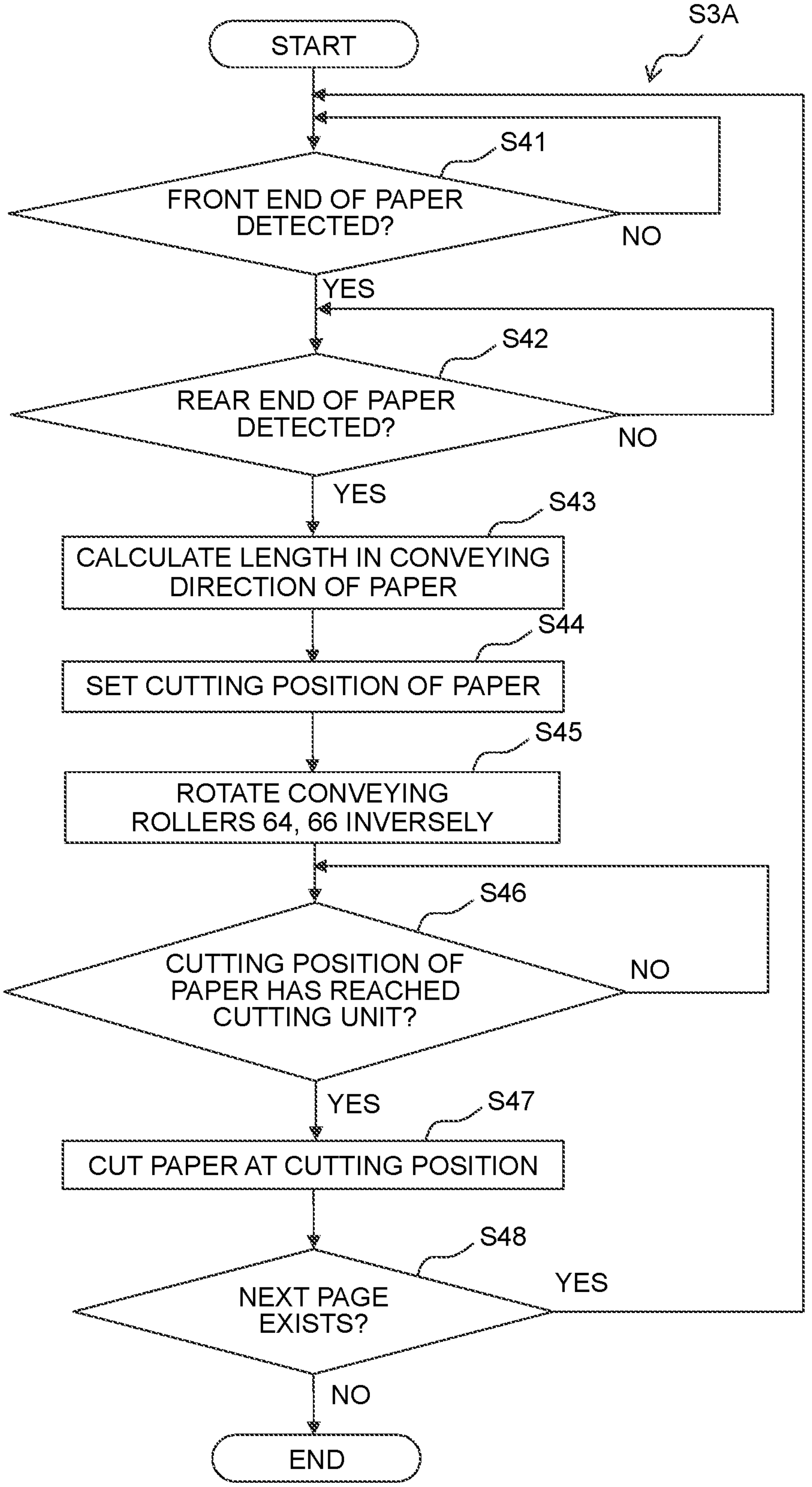
FIG. 8 is a flowchart depicting a flow of the first printing process by a controller of a printing apparatus.

FIG. 8 is a flowchart depicting a flow of control performed by the controller 100 of the printing apparatus 1 according to the second embodiment. In the second embodiment, a flow of control in the first printing process S3 depicted in FIG. 5 is different from the flow in the first embodiment. In the following, a flow of control in a first printing process S3A of the second embodiment will be described with reference to FIG. 2 and FIG. 8. The second embodiment is different from the first embodiment in that the length A in the conveying direction of all of the papers P, including the first sheet of the papers P, taken from the feeding tray 21 will be calculated by conveying the sheets P in the second conveying route R2 in the second conveying direction D2. Note that, regarding the second embodiment, a case in which the printing is performed only on the front surface of the paper P will be described for the convenience of the explanation.

As depicted in FIG. 8, the controller 100 first determines whether the front end of the paper P taken from the feeding tray 21 has been detected or not by using a detection result of the register sensor 120 (step S41). In a case that the front end of the paper P has not been detected (step S41:NO), the controller 100 return the process to the step S41. In a case that the front end of the paper P has been detected (step S41: YES), the controller 100 determines whether the rear end of the paper P has been detected or not (step S42).

Next, in a case that the rear end of the paper P has not been detected (step S42: NO), the controller 100 returns the process to the step S42. In a case that the rear end of the paper P has been detected (S42: YES), the controller 100 calculates the length A in the conveying direction of the paper P, like the step S17 in FIG. 6 (step S43).

Next, in a step S44, the controller 100 sets the cutting position CL of the paper P by using the length A in the conveying direction of the paper P calculated in the step S43. Specifically, the controller 100 sets the cutting position CL of the paper P such that the paper P will be divided into two equal parts in the conveying direction.

Next, in the step S45, the controller 100 conveys the paper P of which length A in the conveying direction has been calculated, in the second conveying direction D2 opposite to the first conveying direction D1 in the second conveying route R2, by rotating the conveying rollers 64, 66 depicted in FIG. 2 inversely.

Next, the controller 100 turns the paper P upside down by conveying the paper P in the second conveying route R2 into the first conveying route R1 via the merging position W, and then the controller 100 conveys the paper P in the first conveying route R1 along the first conveying direction D1. Note that the printing may be performed by the printing unit 3 to the back surface of the paper P having been conveyed to the printing unit 3.

Then, the controller 100 determines whether the cutting position CL of the paper P has reached the position X at which the cutting unit 10 is arranged (step S46). Specifically, the controller 100 determines that the cutting position CL of the paper P has reached the position X when the conveying amount of the paper P detected by the rotary encoder 121 reaches the length L+A1, that is the sum of the length from the front end of the paper P to the cutting position CL (that is, the length A1 of the first paper P1 in the conveying direction) and the distance L described above, after the detection of the front end of the paper P by the register sensor 120. The controller 100 returns the process to the step S46, in a case that the cutting position CL of the paper P has not reached the position X at which the cutting part 10 is arranged (step S46: NO). The controller 100 cuts the paper P at the cutting position CL (step S47) in a case that the cutting position CL of the paper P has reached the position X at which the cutting unit 10 is arranged (step S46: YES).

After the step S47, the controller 100 determines whether the print job includes the next page or not (step S48). In a case that the print job does not include the next page (step S48: NO), the controller 100 ends the first printing process S3A, and discharges the first paper P1 and the second paper P2 to the discharge tray 23. On the other hand, in a case that the print job includes the next page (S48: YES), the controller 100 returns the process to the step S41 after discharging the first paper P1 and the second paper P2 to the discharge tray 23.

The printing apparatus 1 of the second embodiment described above also can achieve effects same as or similar to those of the first embodiment. Especially, in the second embodiment, the length A in the conveying direction of each of the papers P is calculated (step S43), and the cutting position CL of each of the papers P is set (step S44) by using the calculated length A in the conveying direction of each of the papers P, in a case that the printing is continuously performed to the plurality of papers P. Thus, in a case that the printing is performed continuously to the plurality of papers P, it is possible to accurately cut all of the papers P at the desired cutting position CL by calculating the length A in the conveying direction of the paper P every time before the paper P is cut.

In the step S45, each of the plurality of papers P is conveyed in the second conveying route R2 in the second conveying direction D2. Thus, it is possible to make orientation of image printed on each of the papers P identical to each other. Further, it is possible to accurately cut each of the papers P at the desired cutting position CL after performing double-side printing to the plurality of papers P.

Note that, in the second embodiment, the length A in the conveying direction of each of the plurality of papers P is calculated (step S43), and the cutting position CL is set for each of the papers P (step S44). However, there is no limitation thereto. For example, after calculating the length A in the conveying direction of the first sheet of the papers P (step S43), the calculated length A in the conveying direction of the first sheet of the papers P may be used continuously in the printing for the second and the following sheets of the papers P. In such a case, the second and the following sheets of the papers P can be cut swiftly because it is not necessary to calculate the length A in the conveying direction of the second and the following sheets of the papers P.

THIRD EMBODIMENT

Next, a flow of control performed by the controller 100 of the printing apparatus 1 according to the third embodiment of the present disclosure will be described with reference to FIG. 9. Note that for the convenience of the explanation, members having functions same as those of the members explained in the first embodiment described above will be indicated by referential numerals same as those of the members explained in the first embodiment, and explanation for such members will not be repeated.

[Control Operation of Controller]

Figure 9:
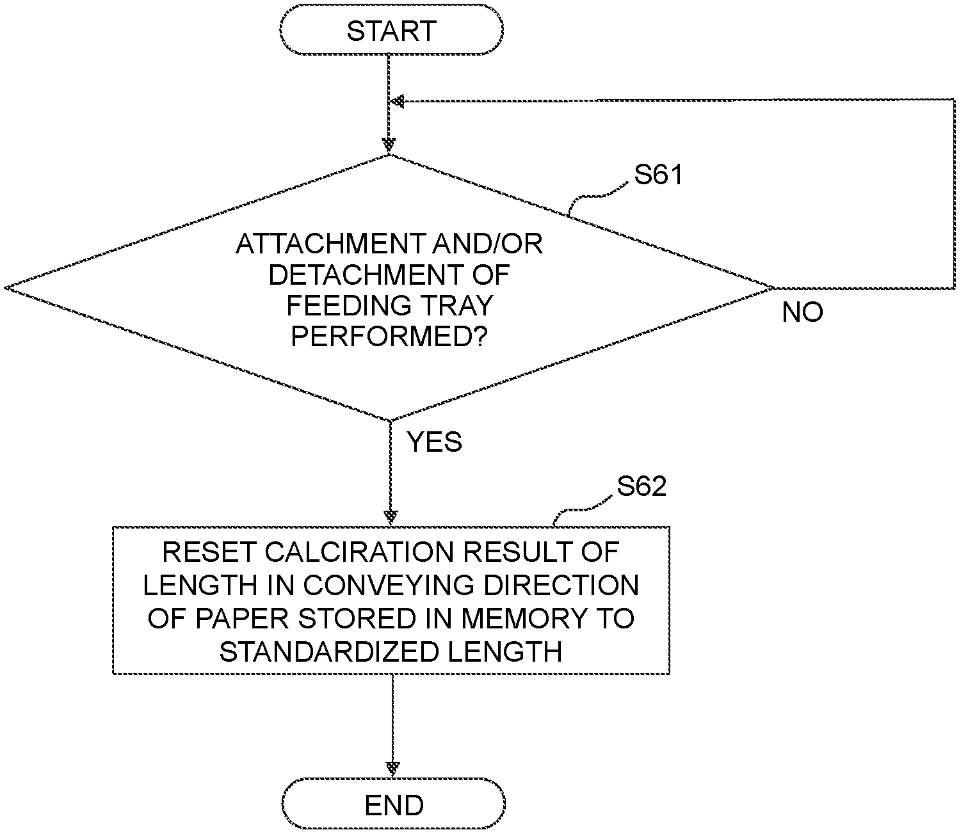
FIG. 9 is a flowchart depicting a flow of an attachment and detachment detecting process by a controller of a printing apparatus.

FIG. 9 is a flowchart depicting a flow of attachment and detachment detecting process performed by the controller 100 of the printing apparatus 1 according to the third embodiment. The third embodiment is different from the first embodiment in that the controller 100 continuously performs the attachment and detachment detection process depicted in FIG. 9, taking the situation described below into consideration. That is, the situation in which the attachment and/or detachment of the feeding tray 21 and/or the feeding tray 22 are/is performed and a bundle of new paper P is accommodated in the feeding tray 21 and/or the feeding tray 22, during a period in which the first printing process S3 of the first embodiment depicted in FIG. 6 is performed.

In the attachment and detachment detecting process depicted in FIG. 9, in a case that the power of the printing apparatus 1 is turned on, the controller 100 determines whether the attachment and/or detachment of any one of the feeding trays 21, 22 is performed or not. Specifically, the controller 100 continuously detects whether the feeding trays 21, 22 are installed in the printing apparatus 1 or not based on the detecting result of the installation sensor 123.

In a case that the attachment and/or detachment of any of the feeding trays 21, 22 is performed (S61: YES), the controller 100 returns the length A in the conveying direction of the paper P stored in the EEPROM 104 to the standardized length (step S62). By doing so, the length in the conveying direction of the paper P to be obtained in the step S11 of the FIG. 6 is initialized to the standardized length.

On the other hand, in a case that the attachment and/or detachment of any of the feeding trays 21, 22 is not performed (S61: NO), the controller 100 returns the process to the step S61. Then, the controller 100 set the cutting position CL of the paper P at the step S12, by using the length A in the conveying direction of the paper P updated in the step S18 in FIG. 6, until the attachment and/or detachment of the feeding tray 21 and/or the feeding tray 22 are/is detected.

After the feeding tray 21 and/or the feeding tray 22 are/is installed into (attached to) the printing apparatus 1, the controller 100 calculates the length A in the conveying direction of the first sheet of the papers P conveyed after the installation of the feeding tray 21 and/or the feeding tray 22 in the step S17 of FIG. 6, and uses the calculated length A for setting the cutting position CL of the second and the following sheets of the papers P conveyed after the installation of the feeding tray 21 and/or the feeding tray 22. Such process is performed taking the fact that the papers P in the same bundle has less errors in the lengths A in the conveying direction of the papers P into consideration.

In the third embodiment described above, in a case that the attachment and/or detachment of the feeding tray 21 and/or the feeding tray 22 are/is performed (S61: YES), the length in the conveying direction of the first sheet of the papers P conveyed after the installation of the feeding tray 21 and/or the feeding tray 22 is used for setting the cutting position CL of the second and the following sheets of the papers P conveyed after the installation of the feeding tray 21 and/or the feeding tray 22. Thus, it is possible to reduce the degradation of the cutting accuracy. Further, because it is not necessary to calculate the length A in the conveying direction of each of the plurality of papers P, it is possible to reduce time required to perform printing process.

In a case that the attachment and/or detachment of the feeding tray 21 and/or the feeding tray 22 are/is performed (S61: YES), it is regarded that a bundle of the papers P is replaced by the user, and the controller 100 returns the length A in the conveying direction of the paper P stored in the EEPROM 104 to the standardized length (step S62). By doing so, it is possible to reduce influence of size errors of the papers P which is caused by changing of the maker of the papers P, etc.

Note that, in the third embodiment, a case in which the process depicted in FIG. 9 is incorporated into the first printing process S3 of the first embodiment is described. However, there is no limitation thereto. The process depicted in FIG. 9 may be incorporated into the printing process S3A of the second embodiment.

FOURTH EMBODIMENT

Next, a printing apparatus 1A according to the fourth embodiment of the present disclosure will be described with reference to FIG. 10. Note that for the convenience of the explanation, members having functions same as those of the members explained in the first embodiment described above will be indicated by referential numerals same as those of the members explained in the first embodiment, and explanation for such members will not be repeated.

[Configuration of the Printing Apparatus]

Figure 10:
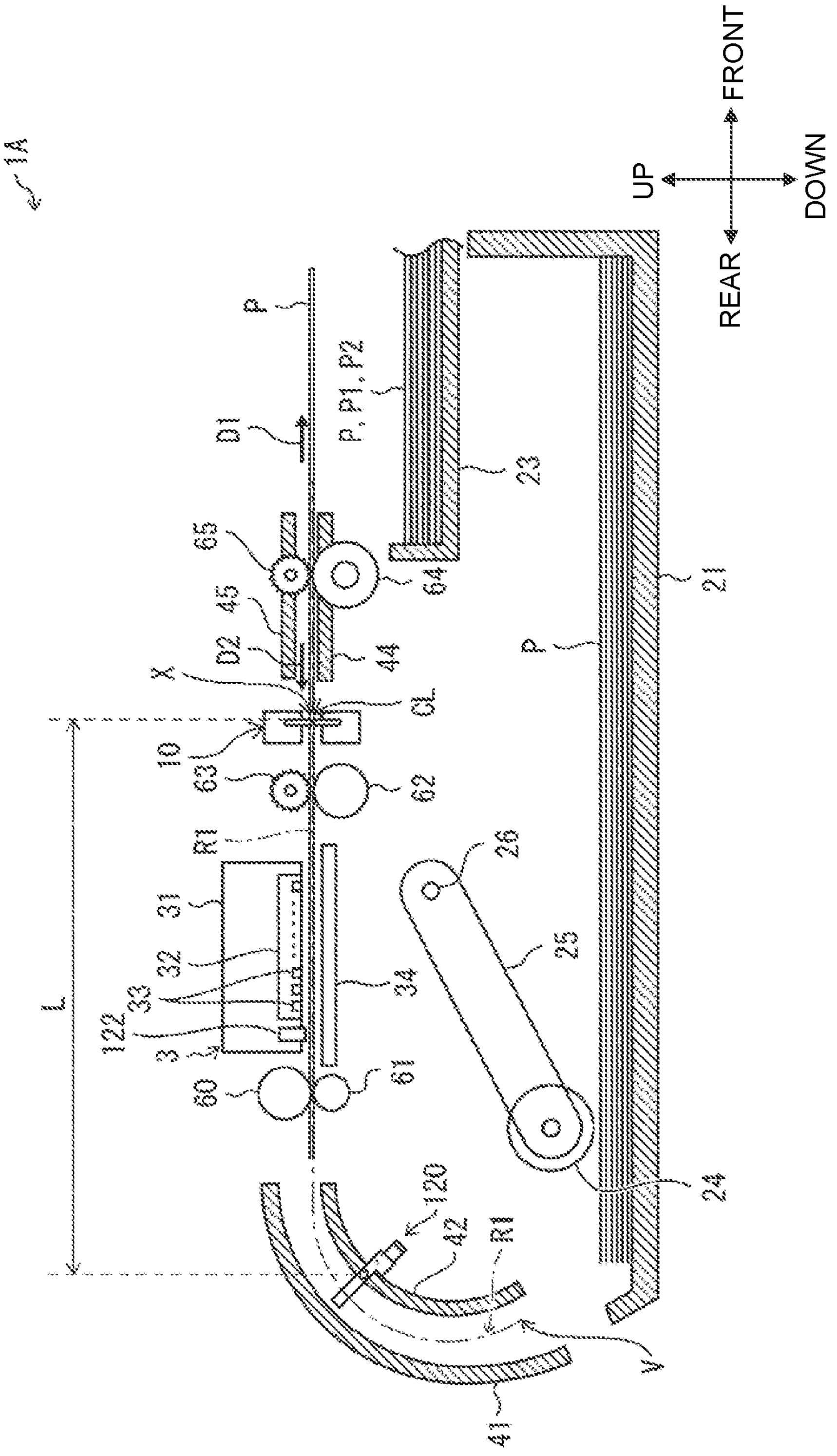
FIG. 10 is a cross-sectional view depicting an internal structure of a printing apparatus.

FIG. 10 is a cross sectional view depicting the internal configuration of the printing apparatus 1A according to the fourth embodiment. As depicted in FIG. 10, the printing apparatus 1A according to the fourth embodiment is different from the printing apparatus 1 according to the first embodiment depicted in FIG. 2 in that the second conveying route R2 is not provided.

As depicted in FIG. 10, the printing apparatus 1A includes the feeding trays 21, 22, the discharge tray 23, the feeding roller 24, the first conveying route R1, the conveying roller 60 and the pinch roller 61, the printing unit 3, the conveying roller 62 and the spur roller 63, the conveying roller 64 and the spur roller 65, and the cutting unit 10. Note that the drawing of the feeding tray 22 is omitted in FIG. 10.

The distance L between the register sensor 120 and the cutting unit 10 is shorter than the length of the part obtained by dividing the paper P having the A4 size into two equal parts, and is shorter than the length of the part obtained by dividing the paper P having the letter size into two equal parts.

[Flow of the Control Performed by the Controller]

Next, the flow of the control performed by the controller 100 of the printing apparatus 1A according to the fourth embodiment will be explained. In the fourth embodiment, basically, the control by the controller 100 is performed like the second embodiment. That is, the first printing process S3A depicted in FIG. 8, and the second printing process S4 depicted in FIG. 7 are performed. In the following, aspects different from those of the first printing process S3A and the second printing process S4 of the second embodiment will be described.

In the fourth embodiment, the controller 100 switchbacks the paper P, in the first conveying route R1, in the second conveying direction D2 being opposite to the first conveying direction D1, as depicted in FIG. 10, by rotating the conveying rollers 64, 66 inversely. Then, after cutting the paper P at the cutting position CL in the step S47, the controller 100 conveys the paper P in the first conveying route R1 in the first conveying direction D1 again, and discharges the first paper P1 and the second paper P2 to which the printing has been performed, to the discharge tray 23.

In the fourth embodiment, the first printing process S3A depicted in FIG. 8 is revised as follows. That is, after the length A in the conveying direction of the first sheet of the papers P is calculated in the step S43, the cutting position CL of the second and the following sheets of the papers P will be set in the step S44 by using the calculation result of the first sheet of the papers P obtained in the step S43. That is, for the second and the following sheets of the papers P, the process of the step S43 is omitted.

By the printing apparatus 1A according to the fourth embodiment described above, the effects same as or similar to those of the second embodiment can be achieved. Especially, the step S45 is sufficiently performed by conveying the paper P in the first conveying route R1 in the second conveying direction D2, providing the second conveying route R2 is not necessary unlike the printing apparatus 1 according to the second embodiment. By doing so, it is possible to cut the paper P into a desired size by a simple configuration such that the paper P having the desired size is available.

In the fourth embodiment, after calculating the length A in the conveying direction of the first sheet of the papers P in the step S43 of FIG. 8, the cutting positions CL of the second and the following sheets of the papers P will be set in the step S44 by using the calculation result of the first sheet of the papers P obtained in the step S43. By doing so, it is possible to cut the plurality of papers P swiftly and accurately in continuous printing.

OTHER EMBODIMENTS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The printing apparatuses 1 according to the first to fourth embodiments are each an inkjet printer of a serial-system. However, there is no limitation thereto. The printing apparatus 1 may be an inkjet printer of a line-system, for example. The system of printing is not limited to the inkjet-system, but may be electrophotographic-system.

In the explanation of the first to fourth embodiments, the paper P is divided into two equal parts. However, there is no limitation thereto. The paper P may be divided into three equal parts, for example, and the cutting position CL of the paper P may be changed as appropriate depending on the size of the printing data. Further, in the explanation of the first embodiment, the paper P is divided into two equal parts accurately. However, there is no limitation thereto. The wording of "dividing the medium into two equal parts" includes dividing the medium into two parts having size difference within a predetermined tolerance. For example, in a case that the paper P of the A4 size of which length A in the conveying direction is A=297 mm is divided into two equal parts, it is acceptable that the lengths A1, A2 in the conveying direction of the first paper P1 and the second paper P2 to be generated have the error of approximately ±0.5 mm with respect to the length in the conveying direction of 148.5 mm being precise half of the length of 297 mm.

In the first to fourth embodiments described above, the cutting unit 10 is the cutter mechanism. However, there is no limitation thereto. For example, the cutting unit 10 may be a mechanism configured to form perforations at the cutting position CL of the paper P. Further, the cutter unit 10 is provided in the first conveying route R1 at a position downstream of the printing unit 3 in the first to fourth embodiments. However, there is no limitation thereto. The cutting unit 10 may be provided in the first conveying route R1 at a position upstream of the printing unit 3.

In the first to fourth embodiments describe above, the controller 100 includes the CPU 101 and the ASIC 105. However, there is no limitation thereto. The controller 100 may have a configuration in which one or more CPU 101 is included, and a configuration in which one or more hard circuit such as ASIC 105 etc. is included.

The present disclosure is not limited to the above-described embodiments, and various changes are possible within the scope of the claims. Any embodiments obtained by combining technical means disclosed respectively in the different embodiments as appropriate are also included in the technical scope of the invention.

What is claimed is:

1. A printing apparatus comprising:

a holder configured to accommodate a printing medium;

a conveyor configured to take the printing medium from the holder and configured to convey the printing medium along a conveying direction;

a printer configured to perform printing on the printing medium conveyed by the conveyor;

a cutter configured to cut the printing medium conveyed by the conveyor;

a first detector which is provided upstream in the conveying direction of the cutter, and which is configured to detect a front end and a rear end of the printing medium conveyed by the conveyor; and a controller, wherein:

a distance in the conveying direction between the first detector and the cutter is shorter than a length in the conveying direction of one of media generated by dividing the printing medium into n-pieces of media (n is an integer not smaller than 2); and the controller is configured to:

calculate a length in the conveying direction of the printing medium by using a result of a detecting of the front end and the rear end of the printing medium by the first detector, and set a cutting position of the printing medium so that the printing medium is divided into the n-pieces of media in the conveying direction; and cause the cutter to cut the printing medium at the set cutting position.

2. The printing apparatus according to claim 1, wherein:

the printing medium includes a plurality of media; and the controller is configured to set the cutting position of a second medium, of the plurality of media, so that the second medium is divided into the n-pieces of media in the conveying direction, by using the calculated length in the conveying direction of a first medium of the plurality of media, the second medium being a medium following the first medium.

3. The printing apparatus according to claim 2, further comprising a non-transitory computer-readable storage medium storing a standardized length based on a standard predefined for the printing medium, wherein the controller is configured to set the cutting position of the first medium so that the first medium is divided into the n-pieces of media in the conveying direction, by using the standardized length stored in the non-transitory computer-readable storage medium.

4. The printing apparatus according to claim 3, wherein the controller is configured to cause the cutter to cut the first medium, at the cutting position of the first medium set by using the standardized length stored in the non-transitory computer-readable storage medium, without causing the conveyor to convey the first medium in a direction opposite to the conveying direction.

5. The printing apparatus according to claim 2, wherein:

the controller is configured to:

calculate the length in the conveying direction of each of the plurality of media, whenever each of the plurality of media is taken from the holder; and set the cutting position of each of a plurality of next media so that each of the plurality of next media is divided into the n-pieces of media in the conveying direction, by using the calculated length in the conveying direction of each of the plurality of media, each of the plurality of next media being taken from the holder next to each of the plurality of media.

6. The printing apparatus according to claim 2, further comprising:

a non-transitory computer-readable storage medium storing a standardized length based on a standard predefined for the printing medium, and a second detector configured to detect whether the holder is attached to the printing apparatus or not, wherein:

the non-transitory computer-readable storage medium is configured to store the calculated length in the conveying direction of the printing medium; and in a case that the controller determines that the holder is attached to and/or detached from, the printing apparatus, based on a detecting result by the second detector, the controller is configured to:

calculate the length in the conveying direction of a third medium, of the plurality of media, conveyed by the conveyor after the holder is attached to the printing apparatus;

update the length in the conveying direction of the printing medium stored in the non-transitory computer-readable storage medium to the length in the conveying direction of the third medium calculated after the holder is attached to the printing apparatus; and set the cutting position of a fourth medium, of the plurality of media, so that the fourth medium is divided into the n-pieces of media in the conveying direction, by using the updated length in the conveying direction of the printing medium, the fourth medium being a medium following the third medium.

7. The printing apparatus according to claim 6, wherein: the holder includes a plurality of holders; and the controller is configured to:

calculate the length in the conveying direction of the first medium conveyed by the conveyor, for respective holders of the plurality of holders; and set the cutting position of the second medium so that the second medium is divided into the n-pieces of media in the conveying direction, by using the calculated length in the conveying direction of the first medium, the second medium being the medium following the first medium, the first medium and the second medium being accommodated in one of the plurality of holders identical to each other, for the respective holders; and the non-transitory computer-readable storage medium is configured to store the length in the conveying direction corresponding to the printing medium accommodated in the holder, for the respective holders.

8. The printing apparatus according to claim 6, wherein in a case that the controller determines that the holder is attached to and/or detached from the printing apparatus based on a detecting result of the second detector, the controller is configured to set the cutting position of the third medium so that the third medium is divided into the n-pieces of media in the conveying direction, by using the standardized length stored in the non-transitory computer-readable storage medium.

9. The printing apparatus according to claim 1, wherein: the controller is configured to:

cause the conveyor to convey the printing medium of which length in the conveying direction is calculated to an opposite direction opposing to the conveying direction; and set the cutting position of the printing medium conveyed in the opposite direction so that the printing medium conveyed in the opposite direction is divided into the n-pieces of media in the conveying direction, by using the calculated length in the conveying direction of the printing medium conveyed in the opposite direction.

10. The printing apparatus according to claim 9, further comprising:

a first conveying route configured to convey the printing medium accommodated in the holder to the first detector, the printer, and the cutter along the conveying direction;

a second conveying route which is branched from the first conveying route at a position downstream in the conveying direction of the printer to extend in the opposite direction, and which merges with the first conveying route at a position upstream in the conveying direction of the printer and the cutter, wherein the controller is configured to cause the conveyor to convey the printing medium of which length in the conveying direction is calculated in the opposite direction in the second conveying route.

11. The printing apparats according to claim 10, wherein the printing medium includes a plurality of media; and the controller is configured to:

cause the conveyor to convey a following medium, of the plurality of media, in the opposite direction in the second conveying route, the following medium being a medium taken from the holder following the printing medium of which length in the conveying direction is calculated; and set the cutting position of the following medium conveyed in the second conveying route in the opposite direction, so that the following medium is divided into the n-pieces of media in the conveying direction in the first conveying route.

12. The printing apparatus according to claim 10, wherein the printing medium includes a plurality of media; and the controller is configured to;

calculate the length in the conveying direction of each of the plurality of media, and cause the conveyor to convey each of the plurality of media of which length in the conveying direction is calculated in the opposite direction, whenever each of the plurality of media is taken from the holder; and set the cutting position of each of the plurality of media conveyed in the opposite direction so that each of the plurality of media conveyed in the opposite direction is divided into the n-pieces of media in the conveying direction, by using the calculated length in the conveying direction of each of the plurality of media conveyed in the opposite direction.

13. The printing apparatus according to claim 1, wherein the controller is configured to:

determine whether the printing medium taken from the holder is a first printing medium or a second printing medium, a length in the conveying direction of one of media generated by dividing the first printing medium into the n-pieces of media being longer than the distance in the conveying direction between the first detector and the cutter, a length in the conveying direction of one of media generated by dividing the second printing medium into the n-pieces of media being shorter than the distance in the conveying direction between the first detector and the cutter;

in a case that the controller determines that the printing medium is the second printing medium, calculate a length in the conveying direction of the second printing medium based on a result of the detecting of the front end and the rear end of the second printing medium by the first detector;

set the cutting position of the second printing medium so that the second printing medium is divided into the n-pieces of media in the conveying direction, by using the calculated length in the conveying direction of the second printing medium, and cause the cutter to cut the second printing medium, at the set cutting position of the second printing medium, without causing the conveyor to convey the second printing medium of which length in the conveying direction is calculated, in a direction opposite to the conveying direction.

* * * * *